(12) United States Patent
Tabata et al.

(10) Patent No.: US 11,420,610 B2
(45) Date of Patent: Aug. 23, 2022

(54) VEHICLE AND CONTROL METHOD OF THE SAME

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Tooru Matsubara, Toyota (JP); Yuuki Makino, Aichi-gun (JP); Keisuke Omuro, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 135 days.

(21) Appl. No.: 16/985,678

(22) Filed: Aug. 5, 2020

(65) Prior Publication Data

US 2021/0039622 A1 Feb. 11, 2021

(30) Foreign Application Priority Data

Aug. 8, 2019 (JP) .............................. JP2019-146165

(51) Int. Cl.
*B60R 16/023* (2006.01)
*B60W 10/12* (2012.01)

(52) U.S. Cl.
CPC ........... *B60W 10/12* (2013.01); *B60R 16/023* (2013.01); *B60W 2510/1025* (2013.01); *B60W 2710/1055* (2013.01)

(58) Field of Classification Search
CPC ......... B60W 10/12; B60W 2510/1025; B60W 2710/1055; B60W 20/20; B60R 16/023; Y02T 10/72; B60K 6/24; B60K 6/26; B60K 6/28; B60K 6/365; B60K 6/38; B60K 6/445
See application file for complete search history.

(56) References Cited

U.S. PATENT DOCUMENTS

2018/0154882 A1* 6/2018 Sasaki ...................... B60K 6/52

FOREIGN PATENT DOCUMENTS

| DE | 112016005384 T5 | 8/2018 | |
|---|---|---|---|
| JP | 2008221934 A | 9/2008 | |
| JP | 2011218871 A | 11/2011 | |
| WO | 2017089060 A1 | 6/2017 | |
| WO | WO-2018110346 A1 * | 6/2018 | ........... B60K 17/344 |

* cited by examiner

*Primary Examiner* — Justin Holmes
(74) *Attorney, Agent, or Firm* — Hunton Andrews Kurth LLP

(57) ABSTRACT

A vehicle includes driving wheels, driven wheels, a drive device connected to a drive shaft, a drive force distribution device, and an electronic control unit configured to execute a moderate change process on a required torque required for the drive shaft to set a target torque to be output to the drive shaft when the torque output to the drive shaft changes and crosses a value of zero. The electronic control unit is configured to control the drive device such that the target torque is output to the drive shaft, and set the target torque such that a change in the target torque with respect to a change in the required torque is more moderate when the driving side distribution ratio is small compared with the change in the target torque with respect to the change in the required torque when the driving side distribution ratio is large.

4 Claims, 7 Drawing Sheets

| | C1 | C2 | B1 | B2 | F1 |
|---|---|---|---|---|---|
| 1st | ○ | – | – | (○) | ○ |
| 2nd | ○ | – | ○ | – | – |
| 3rd | ○ | ○ | – | – | – |
| 4th | – | ○ | ○ | – | – |
| R. | ○ | – | – | ○ | – |

* ○:ENGAGED, "–":DISENGAGED

VEHICLE AND CONTROL METHOD OF THE SAME

CROSS-REFERENCE TO RELATED APPLICATION

This application claims priority to Japanese Patent Application No. 2019-146165 filed on Aug. 8, 2019, incorporated herein by reference in its entirety.

BACKGROUND

1. Technical Field

The disclosure relates to a vehicle and a control method of the vehicle.

2. Description of Related Art

A vehicle including an engine, a first motor, a planetary gear mechanism, and a second motor has been proposed (see, for example, Japanese Unexamined Patent Application Publication No. 2008-221934 (JP 2008-221934 A)). The planetary gear mechanism is connected to the engine, the first motor, and a drive shaft connected to driving wheels. The second motor is connected to the drive shaft. In this vehicle, when a torque output to the drive shaft is within a predetermined range including a value of zero, a target torque is set by executing a rate process on a required torque using a smaller rate value than in other cases. Accordingly, the engine, the first motor, and the second motor are controlled so that the set target torque is output to the drive shaft. This makes it possible to suppress a shock that tends to occur when the torque output to the drive shaft changes from the negative side to the positive side.

A vehicle including an engine, a transmission, and a transfer has also been proposed (for example, see Japanese Unexamined Patent Application Publication No. 2011-218871 (JP 2011-218871 A)). The transmission is connected to the engine. The transfer is connected to a front propeller shaft and a rear propeller shaft. The front propeller shaft is connected to the transmission and front wheels serving as driven wheels. The rear propeller shaft is connected to rear wheels serving as driving wheels. Here, the transfer changes distribution of the drive force transmitted to the front wheels and the drive force transmitted to the rear wheels from the drive force output from the engine through the transmission so that the distribution is continuously changeable in a range, for example, between 0:100 and 50:50.

SUMMARY

In recent years, a hardware configuration in which components on the driving wheel side of the drive shaft of the vehicle in JP 2008-221934 A are replaced with the transfer, the front propeller shaft, the front wheels, the rear propeller shaft, and the rear wheels, etc. in JP 2011-218871 A has increasingly been used. With such a hardware configuration, the difference in an influence of a backlash in the transfer and in a mechanical mechanism on the front wheel side and on the rear wheel side of the transfer when the torque output to the drive shaft (torque input to the transfer) crosses the value of zero varies depending on a driving side distribution ratio, which causes a difference in the magnitude of the shock. The driving side distribution ratio is the ratio of the drive force transmitted to the driving wheels with respect to the total drive force transmitted from the drive shaft to the driving wheels and the driven wheels through the drive force distribution device. Thus, in a case where the target torque is set by executing a rate process on the required torque using a uniform rate value regardless of the driving side distribution ratio, there may be cases in which the shock cannot be sufficiently suppressed when the torque output to the drive shaft crosses the value of zero.

The present disclosure relates to a vehicle and a vehicle control method capable of suppressing a shock from occurring when a torque output to a drive shaft crosses a value of zero.

A first aspect of the present disclosure relates to a vehicle. The vehicle includes driving wheels, driven wheels, a drive device connected to a drive shaft, a drive force distribution device, and an electronic control unit. The drive force distribution device is configured to transmit a drive force from the drive shaft to the driving wheels and the driven wheels and adjust a driving side distribution ratio. The driving side distribution ratio is a ratio of the drive force that is transmitted from the drive shaft to the driving wheels with respect to a total drive force that is transmitted from the drive shaft to the driving wheels and the driven wheels. The electronic control unit is configured to execute a moderate change process on a required torque required for the drive shaft to set a target torque to be output to the drive shaft when the torque output to the drive shaft changes and crosses a value of zero. The electronic control unit is configured to control the drive device such that the target torque is output to the drive shaft. The electronic control unit is configured to set the target torque such that a change in the target torque with respect to a change in the required torque is more moderate when the driving side distribution ratio is small compared with the change in the target torque with respect to the change in the required torque when the driving side distribution ratio is large.

In the vehicle according to the present disclosure, the electronic control unit executes the moderate change process on the required torque required for the drive shaft to set the target torque to be output to the drive shaft when the torque output to the drive shaft changes and crosses the value of zero. In this case, the electronic control unit sets the target torque such that the change in the target torque with respect to the change in the required torque is more moderate when the driving side distribution ratio is small compared with the change in the target torque with respect to the change in the required torque when the driving side distribution ratio is large. When the driving side distribution ratio is small (for example, 0.5 or 0.6), as compared with when the driving side distribution ratio is large (for example, 0.9 or 1.0), the influence of the backlash in the drive force distribution device and in a mechanical mechanism on the driving wheel side and the driven wheel side with respect to the drive force distribution device tends to be large when the torque output to the drive shaft crosses the value of zero. Thus, the target torque is set such that the change in the target torque with respect to the change in the required torque is more moderate when the driving side distribution ratio is small compared with the change in the target torque with respect to the change in the required torque when the driving side distribution ratio is large. This makes it possible to suppress a shock from occurring when the torque output to the drive shaft crosses the value of zero. Here, the "moderate change process" represents the process executed for moderating the change in the target torque with respect to the change in the required torque compared with when the torque output to the drive shaft is not close to the value of zero (when an absolute value of the torque is larger than a predetermined value).

In the above vehicle, the electronic control unit may be configured to set the target torque such that the change in the target torque with respect to the change in the required torque is more moderate as the driving side distribution ratio is smaller. According to the above configuration, it is possible to more appropriately suppress a shock from occurring when the torque output to the drive shaft crosses the value of zero.

A second aspect of the present disclosure relates to a control method of a vehicle. The vehicle includes driving wheels, driven wheels, a drive device connected to a drive shaft, a drive force distribution device, and an electronic control unit. The drive force distribution device is configured to transmit a drive force from the drive shaft to the driving wheels and the driven wheels and adjust a driving side distribution ratio. The driving side distribution ratio is a ratio of the drive force transmitted from the drive shaft to the driving wheels with respect to a total drive force transmitted from the drive shaft to the driving wheels and the driven wheels. The control method includes the following: executing, by an electronic control unit, a moderate change process on a required torque required for the drive shaft to set a target torque to be output to the drive shaft when the torque output to the drive shaft changes and crosses a value of zero; controlling, by the electronic control unit, the drive device such that the target torque is output to the drive shaft; and setting, by the electronic control unit, the target torque such that a change in the target torque with respect to a change in the required torque is more moderate when the driving side distribution ratio is small compared with the change in the target torque with respect to the change in the required torque when the driving side distribution ratio is large.

The above control method may further include setting, by the electronic control unit, the target torque such that the change in the target torque with respect to the change in the required torque is more moderate as the driving side distribution ratio is smaller.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A mode for carrying out the disclosure will be described based on an embodiment.

Embodiment

Figure 1:
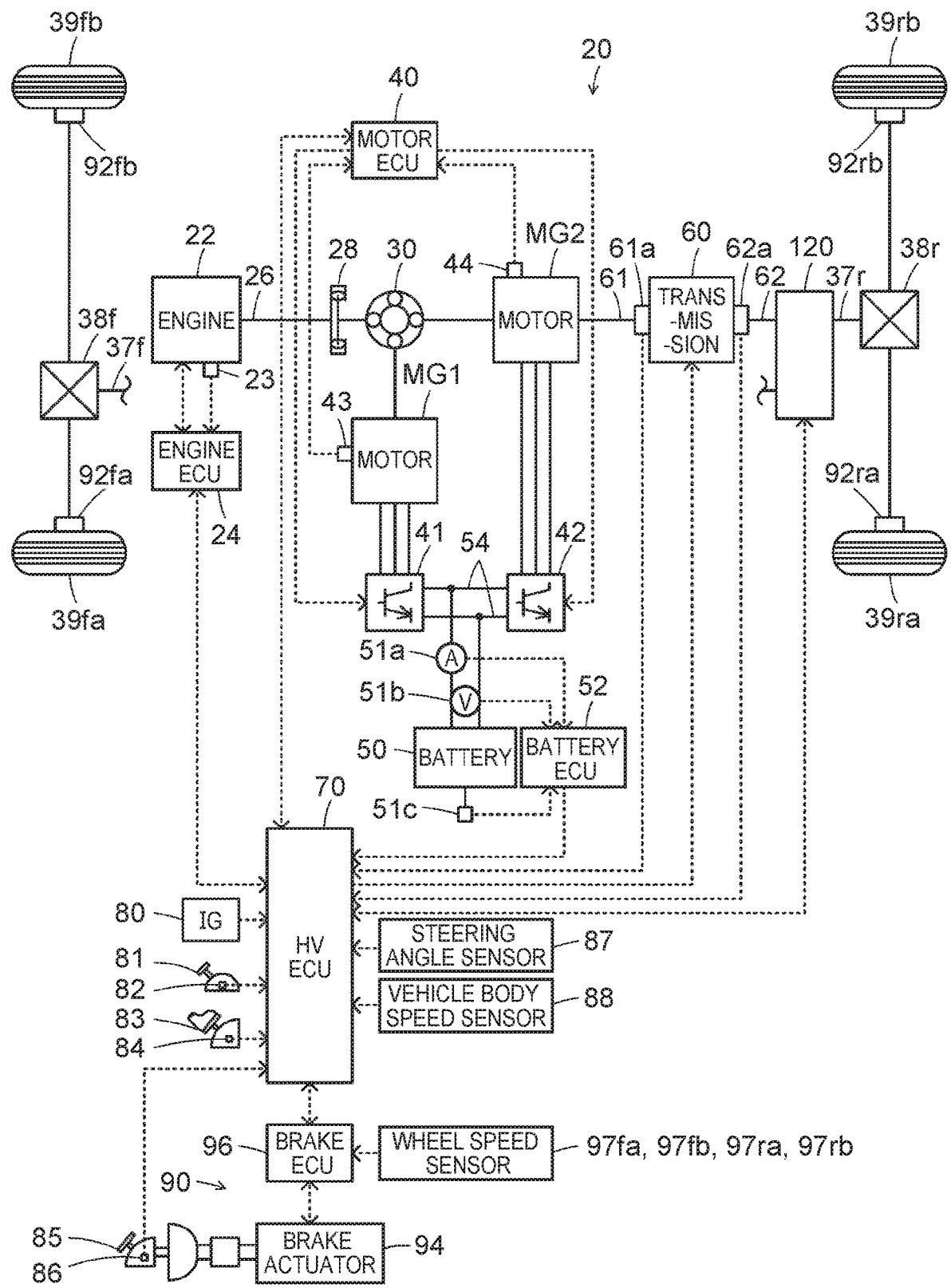
FIG. 1 is a configuration diagram showing an outline of a configuration of a hybrid vehicle 20 according to an embodiment of the disclosure.
Figure 2:
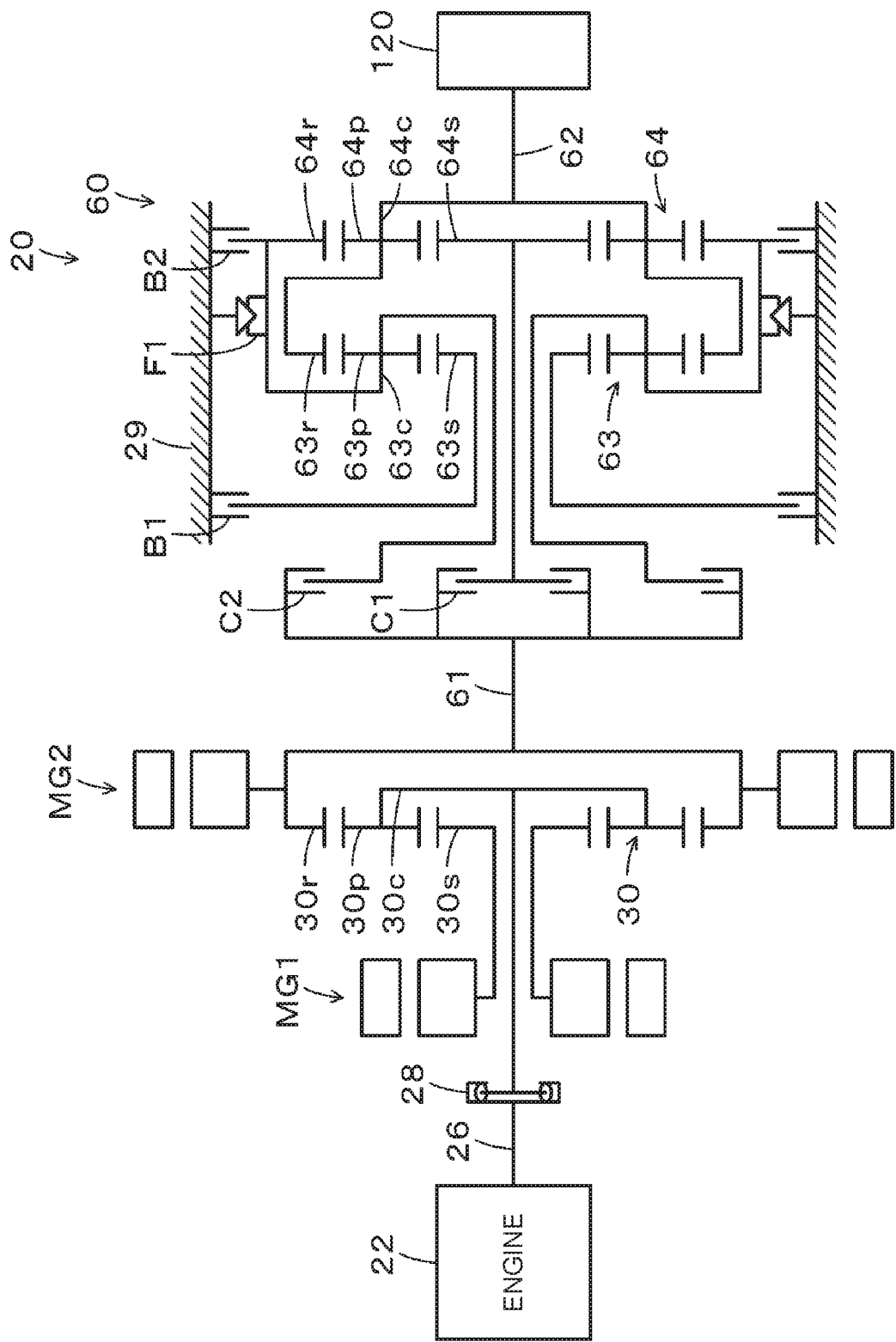
FIG. 2 is a configuration diagram showing an outline of a configuration of an engine 22, a planetary gear 30, motors MG1 and MG2, and a transmission 60.

FIG. 1 is a configuration diagram showing an outline of a configuration of a hybrid vehicle 20 according to an embodiment of the disclosure. FIG. 2 is a configuration diagram showing an outline of a configuration of an engine 22, a planetary gear 30, motors MG1 and MG2, and a transmission 60. The hybrid vehicle 20 in the embodiment is configured as a rear wheel drive-based four-wheel drive vehicle in which rear wheels 39ra and 39rb are driving wheels and front wheels 39fa and 39fb are driven wheels. As shown in FIGS. 1 and 2, the hybrid vehicle 20 includes the engine 22, the planetary gear 30, the motors MG1 and MG2, inverters 41 and 42, a battery 50, the transmission 60, a transfer 120, and a hydraulic brake device 90 and an electronic control unit for hybrid vehicles (hereinafter referred to as "HV ECU") 70.

The engine 22 is configured as an internal combustion engine that outputs power using gasoline, light oil, or the like as fuel. The operation of the engine 22 is controlled by an electronic control unit for engines (hereinafter referred to as "engine ECU") 24.

The engine ECU 24 is configured as a microprocessor having a central processing unit (CPU) as a main part (not shown). The engine ECU 24 includes, in addition to the CPU, a read-only memory (ROM) that stores a processing program, a random access memory (RAM) that stores data temporarily, an input/output port, and a communication port. Signals from various sensors that are necessary for controlling the operation of the engine 22 are input to the engine ECU 24 from the input port. Signals input to the engine ECU 24 include, for example, a crank angle θcr of a crankshaft 26, which is transmitted from a crank position sensor 23 that detects the rotational position of the crankshaft 26 of the engine 22. Various control signals for controlling the operation of the engine 22 are output from the engine ECU 24 through the output port. The engine ECU 24 is connected to the HV ECU 70 via the communication port. The engine ECU 24 calculates a rotation speed Ne of the engine 22 based on the crank angle θcr transmitted from the crank position sensor 23.

The planetary gear 30 is configured as a single pinion type planetary gear mechanism. The planetary gear 30 includes a sun gear 30s that is an external gear, a ring gear 30r that is an internal gear, a plurality of pinion gears 30p that meshes with the sun gear 30s and the ring gear 30r, and a carrier 30c that supports the pinion gears 30p such that the pinion gears 30p can rotate and revolve. The sun gear 30s is connected to a rotor of the motor MG1. The ring gear 30r is connected to an input shaft 61 of the transmission 60. The carrier 30c is connected to the crankshaft 26 of the engine 22 via a damper 28.

The motor MG1 is configured as, for example, a synchronous generator motor. The rotor of the motor MG1 is connected to the sun gear 30s of the planetary gear 30 as described above. The motor MG2 is configured as, for example, a synchronous generator motor. The rotor of the motor MG2 is connected to the input shaft 61 of the transmission 60. The inverters 41 and 42 are used to drive the motors MG1 and MG2, and are connected to the battery 50 via power lines 54. The motors MG1 and MG2 are rotationally driven through switching control of a plurality of switching elements (not shown) of the inverters 41 and 42, which is executed by an electronic control unit for motors (hereinafter referred to as "motor ECU") 40.

The motor ECU 40 is configured as a microprocessor having a CPU as a main part (not shown). The motor ECU 40 includes, in addition to the CPU, a ROM that stores a processing program, a RAM that stores data temporarily, an input/output port, and a communication port. Signals from various sensors that are necessary for driving and controlling the motors MG1 and MG2 are input to the motor ECU 40 via the input port. The signals input to the motor ECU 40 include, for example, rotational positions θm1 and θm2 of the rotors of the motors MG1 and MG2, which are transmitted from rotational position sensors 43 and 44 that detect rotational positions of the rotors of the motors MG1 and MG2, and phase currents Iu1, Iv1, Iu2, and Iv2 of the respective phases of the motors MG1 and MG2, which are transmitted from a current sensor that detects the phase currents flowing in the respective phases of the motors MG1 and MG2. Switching control signals or the like are output from the motor ECU 40 to the switching elements (not shown) of the inverters 41 and 42 via the output port. The motor ECU 40 is connected to the HV ECU 70 via the communication port. The motor ECU 40 calculates electric angles θe1 and θe2 and rotation speeds Nm1 and Nm2 of the motors MG1 and MG2 based on the rotational positions θm1 and θm2 of the rotors of the motors MG1 and MG2, which are transmitted from the rotational position sensors 43 and 44.

The battery 50 is configured as, for example, a lithium ion secondary battery or a nickel hydride secondary battery, and is connected to the inverters 41 and 42 via the power lines 54 as described above. The battery 50 is controlled by an electronic control unit for batteries (hereinafter referred to as "battery ECU") 52.

The battery ECU 52 is configured as a microprocessor having a CPU as a main part (not shown). The battery ECU 52 includes, in addition to the CPU, a ROM that stores a processing program, a RAM that temporarily stores data, an input/output port, and a communication port. Signals transmitted from various sensors that are necessary for controlling the battery 50 are input to the battery ECU 52 via the input port. The signals input to the battery ECU 52 include, for example, a current Ib of the battery 50, which is transmitted from a current sensor 51a attached to an output terminal of the battery 50 or a voltage Vb of the battery 50, which is transmitted from a voltage sensor 51b attached between the terminals of the battery 50, a temperature Tb of the battery 50, which is transmitted from a temperature sensor 51c attached to the battery 50. The battery ECU 52 is connected to the HV ECU 70 via the communication port. The battery ECU 52 calculates a state of charge SOC of the battery 50 based on an integrated value of the current Ib of the battery 50, which is transmitted from the current sensor 51a. The state of charge SOC is the ratio of the capacity of the electric power that can be discharged from the battery 50 with respect to the total capacity of the battery 50.

The transmission 60 is configured as a four-speed transmission. The transmission 60 includes an input shaft 61, an output shaft (drive shaft) 62, planetary gears 63 and 64, clutches C1 and C2, brakes B1 and B2, and a one-way clutch F1. As described above, the input shaft 61 is connected to the ring gear 30r of the planetary gear 30 and the motor MG2. The output shaft 62 is connected to the transfer 120.

The planetary gear 63 is configured as a single pinion planetary gear mechanism. The planetary gear 63 includes a sun gear 63s that is an external gear, a ring gear 63r that is an internal gear, a plurality of pinion gears 63p that meshes with the sun gear 63s and the ring gear 63r, and a carrier 63c that supports the pinion gears 63p such that the pinion gears 63p can rotate and revolve.

The planetary gear 64 is configured as a single pinion planetary gear mechanism. The planetary gear 64 includes a sun gear 64s that is an external gear, a ring gear 64r that is an internal gear, a plurality of pinion gears 64p that meshes with the sun gear 64s and the ring gear 64r, and a carrier 64c that supports the pinion gears 64p such that the pinion gears 64p can rotate and revolve.

The carrier 63c of the planetary gear 63 and the ring gear 64r of the planetary gear 64 are connected (fixed) to each other. The ring gear 63r of the planetary gear 63 and the carrier 64c of the planetary gear 64 are connected (fixed) to each other. Thus, the planetary gear 63 and the planetary gear 64 function as a so-called four element mechanism with the sun gear 63s of the planetary gear 63, the carrier 63c of the planetary gear 63 and the ring gear 64r of the planetary gear 64, the ring gear 63r of the planetary gear 63 and the carrier 64c of the planetary gear 64, and the sun gear 64s of the planetary gear 64 serving as four rotary elements. The ring gear 63r of the planetary gear 63 and the carrier 64c of the planetary gear 64 are connected (fixed) to the output shaft 62.

The clutch C1 connects the input shaft 61 and the sun gear 64s of the planetary gear 64 to each other and disconnects the input shaft 61 and the sun gear 64s of the planetary gear 64 from each other. The clutch C2 connects the input shaft 61, the carrier 63c of the planetary gear 63, and the ring gear 64r of the planetary gear 64 to each other and disconnects the input shaft 61, the carrier 63c of the planetary gear 63, and the ring gear 64r of the planetary gear 64 from each other. The brake B1 fixes (connects) the sun gear 63s of the planetary gear 63 to a transmission case 29 serving as a stationary member such that the sun gear 63s is not rotatable with respect to the transmission case 29, and releases the sun gear 63s with respect to the transmission case 29 such that the sun gear 63s is rotatable with respect to the transmission case 29. The brake B2 fixes (connects) the carrier 63c of the planetary gear 63 and the ring gear 64r of the planetary gear 64 to the transmission case 29 such that the carrier 63c and the ring gear 64r are not rotatable with respect to the transmission case 29, and releases the carrier 63c and the ring gear 64r with respect to the transmission case 29 such that the carrier 63c and the ring gear 64r are rotatable with respect to the transmission case 29. The one-way clutch F1 allows the carrier 63c of the planetary gear 63 and the ring gear 64r of the planetary gear 64 to rotate in one direction and restricts the rotation thereof in the other direction.

The clutches C1 and C2 are each configured as a hydraulically driven multi-plate clutch. The brakes B1 and B2 are each configured as a hydraulically driven multiple disc brake. The clutches C1 and C2 and the brakes B1 and B2 are operated by a hydraulic control device (not shown) that supplies hydraulic oil to and discharges hydraulic oil from the clutches C1 and C2 and the brakes B1 and B2.

Figures 3, 4:
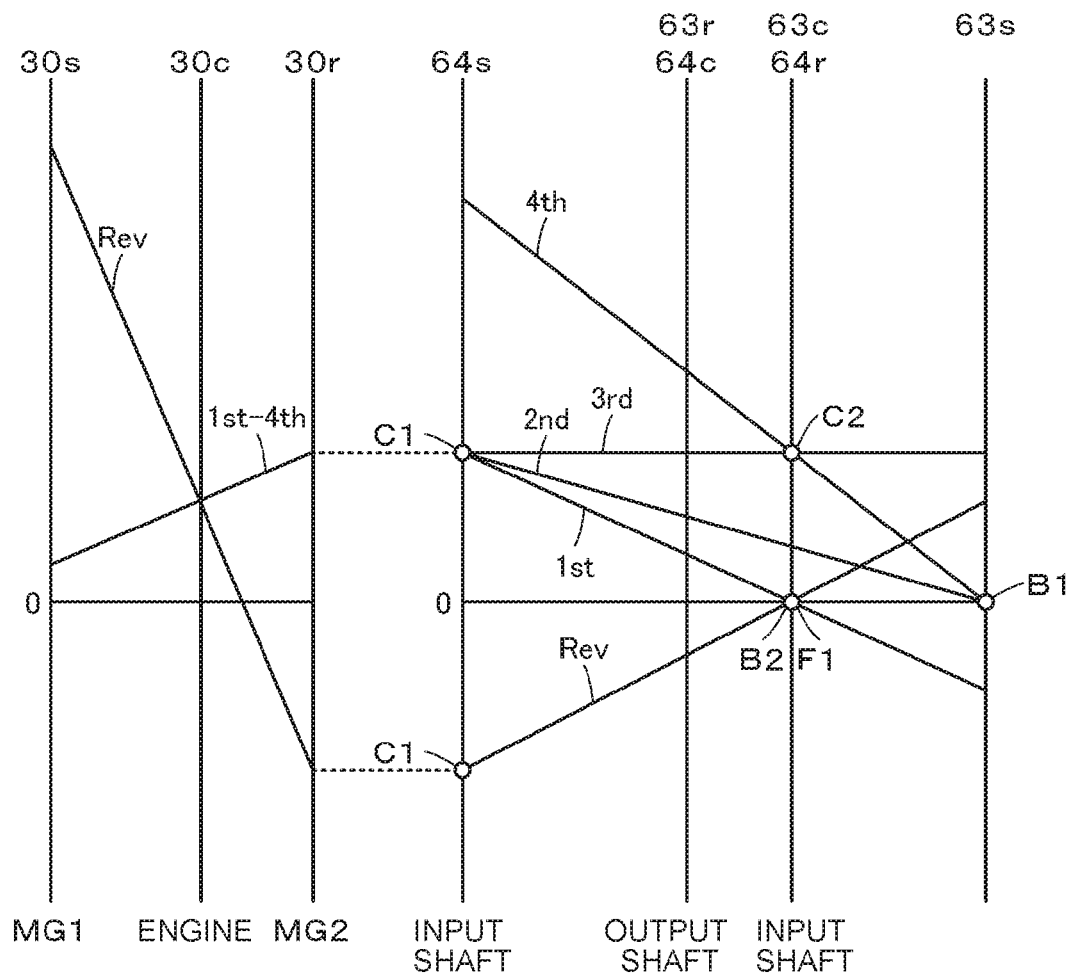
FIG. 3 is an operation table showing a relationship between each gear position of the transmission 60 and an operation state of clutches C1 and C2, brakes B1 and B2, and a one-way clutch F1.
FIG. 4 is a collinear chart showing a relationship between rotational speeds of rotary elements of the planetary gear 30 and the transmission 60.

FIG. 3 is an operation table showing a relationship between each gear position of the transmission 60 and an operation state of the clutches C1 and C2, the brakes B1 and B2, and the one-way clutch F1. FIG. 4 is a collinear chart showing a relationship between rotational speeds of the respective rotary elements of the planetary gear 30 and the transmission 60. In the transmission 60, the forward speeds from the first speed to the fourth speed and the reverse speed are established by engaging or disengaging the clutches C1 and C2, the brakes B1 and B2, and the one-way clutch F1 as shown in FIG. 3.

Specifically, a first forward speed is established by engaging the clutch C1, disengaging the clutch C2 and the brakes B1 and B2, and activating the one-way clutch F1 (in other words, by regulating rotation of the carrier 63c of the planetary gear 63 and the ring gear 64r of the planetary gear 64 in the other direction (negative rotation in FIG. 4)). The brake B2 is also engaged at the first forward speed when a braking force is output to the input shaft 61 of the transmission 60 by regenerative driving of the motor MG2 and motoring, by the motor MG1, of the engine 22 that has stopped fuel injection.

A second forward speed is established by engaging the clutch C1 and the brake B1 and disengaging the clutch C2 and the brake B2. A third forward speed is established by engaging the clutches C1 and C2 and disengaging the brakes B1 and B2. The fourth forward speed is established by engaging the clutch C2 and the brake B1 and disengaging the clutch C1 and the brake B2. The reverse speed is established by engaging the clutch C1 and the brake B2 and disengaging the clutch C2 and the brake B1.

The transfer 120 changes distribution of a front-rear drive force so that the distribution is continuously changeable in a range, for example, between 0:100 and 40:60 or between 0:100 and 50:50. A front-rear drive force distribution is the distribution of the drive force output to the output shaft 62 of the transmission 60, which is to be transmitted to the front wheels 39fa and 39fb serving as the driven wheels and the rear wheels 39ra and 39rb serving as the driving wheels. Accordingly, the hybrid vehicle 20 establishes a two-wheel drive (2WD) state when the front-rear drive force distribution is 0:100, and establishes a four-wheel drive (4WD) state when the front-rear drive force distribution is other than 0:100. In other words, the hybrid vehicle 20 is configured as a part-time 4WD vehicle.

Figure 5:
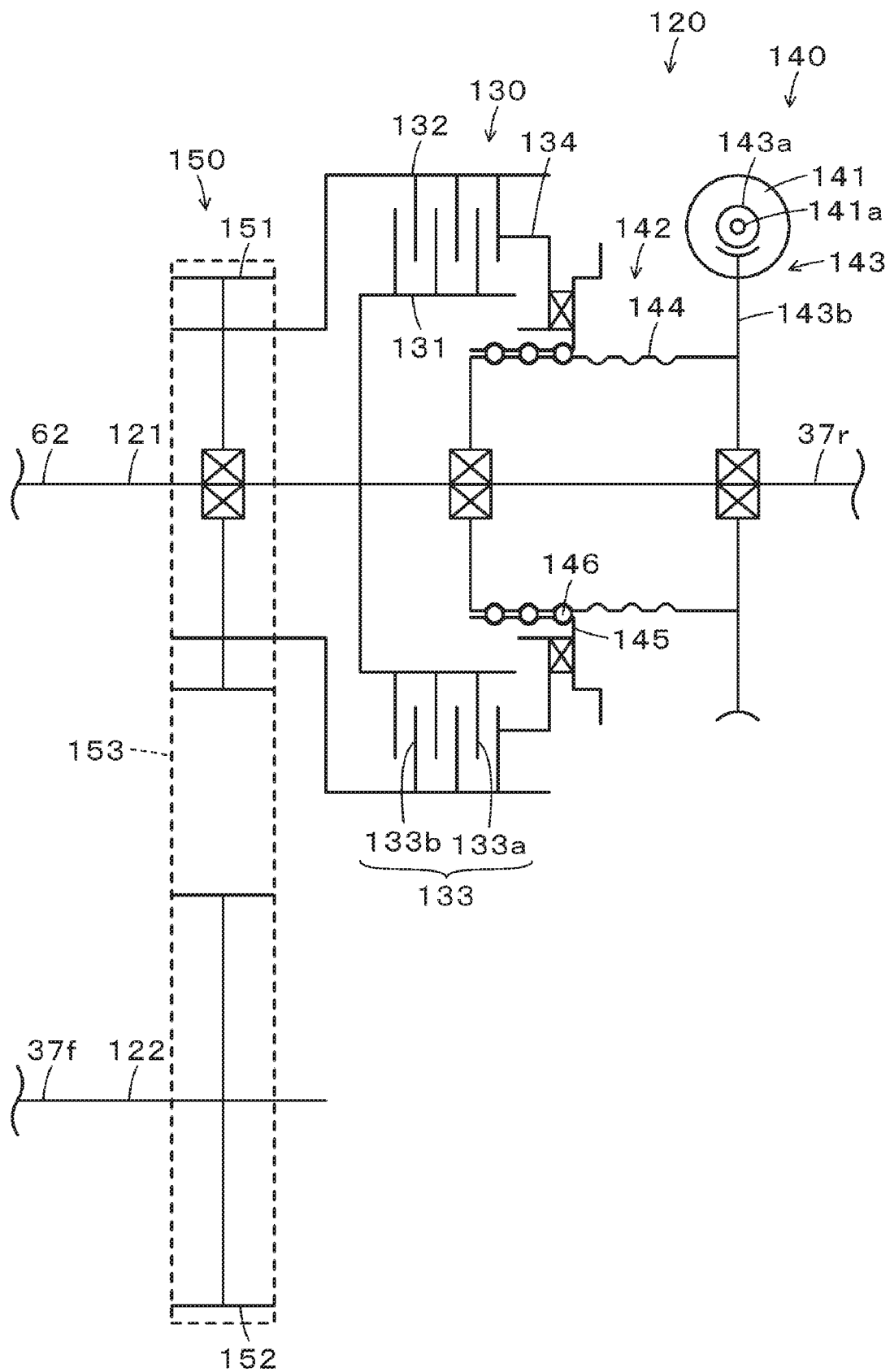
FIG. 5 is a configuration diagram showing an outline of a configuration of a transfer 120.

FIG. 5 is a configuration diagram showing an outline of a configuration of the transfer 120. As shown in FIG. 5, the transfer 120 includes a rear wheel side transmission shaft 121, a front wheel side transmission shaft 122, a clutch 130, a drive unit 140, and a transmission mechanism 150. The rear wheel side transmission shaft 121 is connected to the output shaft 62 (see FIG. 1) of the transmission 60 and is also connected to a rear propeller shaft 37r (see FIG. 1). The front wheel side transmission shaft 122 is connected to a front propeller shaft 37f (see FIG. 1).

The clutch 130 is configured as a multi-plate clutch. The clutch 130 includes a clutch hub 131, a clutch drum 132, a plurality of friction engagement plates 133, and a piston 134. The clutch hub 131 is connected to the rear wheel side transmission shaft 121. The clutch drum 132 is connected to a drive gear 151 of the transmission mechanism 150. In the friction engagement plates 133, first plates 133a that are spline-fitted to an outer peripheral surface of the clutch hub 131, and second plates 133b that are spline-fitted to an inner peripheral surface of the clutch drum 132 are alternately arranged. The piston 134 is disposed on the opposite side of the friction engagement plates 133 from the drive gear 151 of the transmission mechanism 150. The piston 134 moves closer to the drive gear 151 to press the friction engagement plates 133.

When the piston 134 moves in a direction away from the drive gear 151 and is not in contact the friction engagement plates 133, the clutch 130 is in a disengaged state. When the piston 134 moves toward the drive gear 151 and contacts the friction engagement plates 133, an engagement force (torque capacity) is adjusted in accordance with a movement amount of the piston 134, and the clutch 130 is either in the disengaged state, a slip-engaged state, or a fully engaged state.

The drive unit 140 is used to drive the clutch 130. The drive unit 140 includes a motor 141 and a screw mechanism 142. The motor 141 is controlled by the HV ECU 70. The screw mechanism 142 is configured as a ball screw mechanism, and converts rotational movement of the motor 141 into a linear movement. The screw mechanism 142 includes a screw shaft member 144, a nut member 145, and a plurality of balls 146 interposed between the screw shaft member 144 and the nut member 145.

The screw shaft member 144 is connected to the motor 141 via a worm gear 143. The worm gear 143 is a pair of gears including a worm 143a and a worm wheel 143b. The worm 143a is formed integrally with a rotation shaft of the motor 141. The worm wheel 143b is disposed coaxially with the rear wheel side transmission shaft 121 and is formed integrally with the screw shaft member 144. The rotation of the motor 141 is transmitted to the screw shaft member 144 via the worm gear 143 at a reduced speed. [0037] The nut member 145 is connected to the screw shaft member 144 so as to be axially movable with respect to the rear wheel side transmission shaft 121 as the screw shaft member 144 rotates. The nut member 145 is connected to the piston 134 of the clutch 130 so as not to be axially movable with respect to the rear wheel side transmission shaft 121 and so as to be rotatable around the rear wheel side transmission shaft 121.

The screw mechanism 142 converts the rotational movement transmitted from the motor 141 to the screw shaft member 144 into a linear movement of the nut member 145, and transmits the linear movement to the friction engagement plates 133 via the piston 134.

Thereby, the engagement force (torque capacity) of the clutch 130 is adjusted.

The transmission mechanism 150 includes the drive gear 151, a driven gear 152, and a chain 153. As described above, the drive gear 151 is connected to the clutch drum 132 of the clutch 130. The driven gear 152 is attached to the front wheel side transmission shaft 122. The chain 153 is wound around the drive gear 151 and the driven gear 152. The transmission mechanism 150 transmits the drive force transmitted to the drive gear 151 to the driven gear 152 via the chain 153.

In the transfer 120, the rear wheel side transmission shaft 121 and the drive gear 151 are disconnected when the clutch 130 is in the disengaged state. At this time, the transfer 120 transmits all of the drive force output from the output shaft 62 of the transmission 60 to the rear wheels 39ra and 39rb. In the transfer 120, the rear wheel side transmission shaft 121 and the drive gear 151 are connected when the clutch 130 is in the slip-engaged state or the fully engaged state. At this time, the transfer 120 distributes and transmits the drive force output from the output shaft 62 of the transmission 60 to the rear wheels 39ra and 39rb and the front wheels 39fa and 39*fb*. Specifically, when the clutch 130 is in the slip-engaged state, the differential rotation between the rear wheel side transmission shaft 121 and the drive gear 151 is allowed, thereby establishing a differential state. When the clutch 130 is in the fully engaged state, the rear wheel side transmission shaft 121 and the drive gear 151 rotate integrally, thereby establishing a non-differential state (so-called a center differential lock state). Accordingly, the motor 141 controls the engagement force (torque capacity) of the clutch 130, allowing the transfer 120 to continuously change the front-rear drive force distribution in a range, for example, between 0:100 and 40:60 or between 0:100 and 50:50 as described above.

As shown in FIG. 1, the hydraulic brake device 90 includes brake pads 92*fa* and 92*fb* attached to the front wheels 39*fa* and 39*fb*, respectively and brake pads 92*ra* and 92*rb* attached to the rear wheels 39*ra* and 39*rb*, respectively, and a brake actuator 94. The brake actuator 94 is configured as an actuator for adjusting the hydraulic pressures of brake wheel cylinders (not shown) that drive the brake pads 92*fa*, 92*fb*, 92*ra*, and 92*rb* to apply a braking force to the front wheels 39*fa* and 39*fb* and the rear wheels 39*ra* and 39*rb*. The brake actuator 94 is driven and controlled by an electronic control unit for brakes (hereinafter referred to as "brake ECU") 96.

The brake ECU 96 is configured as a microprocessor having a CPU as a main part (not shown). The brake ECU 96 includes, in addition to the CPU, a ROM for storing a processing program, a RAM for temporarily storing data, an input/output port, and a communication port. Signals from various sensors that are necessary to drive and control the brake actuator 94 are input to the brake ECU 96 via the input port. The signals input to the brake ECU 96 include, for example, wheel speeds Vfa and Vfb of the front wheels 39*fa* and 39*fb*, respectively, and wheel speeds Vra and Vrb of the rear wheels 39*ra* and 39*rb*, respectively, which are transmitted from wheel speed sensors 97*fa* and 97*fb* mounted on the front wheels 39*fa* and 39*fb*, respectively, and wheel speed sensors 97*ra* and 97*rb* mounted on the rear wheels 39*ra* and 39*rb*, respectively. A drive control signal or the like is output from the brake ECU 96 to the brake actuator 94 via the output port. The brake ECU 96 is connected to the HV ECU 70 via the communication port.

The HV ECU 70 is configured as a microprocessor having a CPU as a main part (not shown). The HV ECU 70 includes, in addition to the CPU, a ROM for storing a processing program, a RAM for temporarily storing data, an input/output port, and a communication port. Signals from various sensors are input to the HV ECU 70 via the input port. The signals input to the HV ECU 70 include, for example, a rotation speed Nin of the input shaft 61, which is transmitted from a rotation speed sensor 61*a* that detects the rotation speed of the input shaft 61 of the transmission 60, a rotation speed Nout of the output shaft 62, which is transmitted from a rotation speed sensor 62*a* that detects the rotation speed of the output shaft 62 of the transmission 60, and a rotational position θmt of the rotor of the motor 141, which is transmitted from a rotational position sensor 141*a* that detects the rotational position of the rotor of the motor 141 of the transfer 120. The signals input to the HV ECU 70 also include an ignition signal from an ignition switch 80 and a shift position SP transmitted from a shift position sensor 82 that detects the operation position of a shift lever 81. The signals input to the HV ECU 70 also include an accelerator operation amount Acc transmitted from an accelerator pedal position sensor 84 that detects a depression amount of an accelerator pedal 83, and a brake pedal position BP transmitted from a brake pedal position sensor 86 that detects a depression amount of the brake pedal 85. The signals input to the HV ECU 70 also include a steering angle θs transmitted from a steering angle sensor 87 that detects the steering angle of a steering wheel (not shown) and a vehicle body speed V transmitted from a vehicle body speed sensor 88. The HV ECU 70 outputs a control signal to the transmission 60, a control signal to the transfer 120, and the like via the output port.

As described above, the HV ECU 70 is connected to the engine ECU 24, the motor ECU 40, the battery ECU 52, and the brake ECU 96 via the communication port. The HV ECU 70 divides the rotation speed Nin of the input shaft 61 of the transmission 60, which is transmitted from the rotation speed sensor 61*a* by the rotation speed Nout of the output shaft 62 of the transmission 60, which is transmitted from the rotation speed sensor 62*a* to calculate a gear ratio Gr of the transmission 60, and to estimate a gear position Gs of the transmission 60 based on the calculated gear ratio Gr. The HV ECU 70 estimates a movement amount of the piston 134 of the clutch 130, the engagement force and the torque capacity of the clutch 130, and a rear side distribution ratio Rr based on the rotational position θmt of the rotor of the motor 141, which is transmitted from the rotational position sensor 141*a*. The rear side distribution ratio Rr is a ratio of the drive force transmitted to the rear wheels 39*ra* and 39*rb* with respect to the total force transmitted from the output shaft 62 of the transmission 60 via the transfer 120 to a front differential gear 38*f* (front wheels 39*fa* and 39*fb*) and a rear differential gear 38*r* (rear wheels 39*ra* and 39*rb*). As described above, the transfer 120 is configured such that the front-rear drive force distribution can be continuously changed in a range, for example, between 0:100 and 40:60 or between 0:100 and 50:50, so that the rear side distribution ratio Rr is a value between a lower limit value Rrmin (for example, 0.5 or 0.6) and the upper limit value Rrmax (1.0).

In the hybrid vehicle 20 according to the embodiment configured as described above, the engine 22, the motors MG1 and MG2, the transmission 60, and the transfer 120 are controlled by a coordinated control of the HV ECU 70, the engine ECU 24, and the motor ECU 40 such that the hybrid vehicle 20 travels in a hybrid travel mode (HV travel mode) in which the hybrid vehicle 20 travels with the engine 22 being operated and in an electric travel mode (EV travel mode) in which the hybrid vehicle 20 travels without the engine 22 being operated.

The engine 22 and the motors MG1 and MG2 are basically controlled as follows. In the HV travel mode, the HV ECU 70 first sets an output shaft target torque Tout* to be output to the output shaft (drive shaft) 62 of the transmission 60 based on the accelerator operation amount Acc and the vehicle body speed V. A setting method of the output shaft target torque Tout* will be described later. Subsequently, the HV ECU 70 sets an input shaft target torque Tin* to be output to the input shaft 61 of the transmission 60 based on the output shaft target torque Tout* and the gear ratio Gr of the transmission 60. The HV ECU 70 sets a target rotation speed Ne* and a target torque Te* of the engine 22, and torque commands Tm1* and Tm2* of the motors MG1 and MG2 so that the input shaft target torque Tin* is output to the input shaft 61 of the transmission 60 with the engine 22 being operated. Then, the HV ECU 70 transmits the target rotation speed Ne* and the target torque Te* of the engine 22 to the engine ECU 24, and transmits the torque commands Tm1* and Tm2* of the motors MG1 and MG2 to the motor ECU 40. The engine ECU 24 performs intake air amount control, fuel injection control, ignition control, etc.

of the engine 22 so that the engine 22 is operated based on the target rotation speed Ne* and the target torque Te*. The motor ECU 40 drives and controls the motors MG1 and MG2 (specifically, the motor ECU 40 executes switching control of the switching elements of the inverters 41 and 42) so that the motors MG1 and MG2 are driven based on the torque commands Tm1* and Tm2*.

In the EV travel mode, the HV ECU 70 first sets the input shaft target torque Tin* as in the HV travel mode. Subsequently, the HV ECU 70 sets the torque command Tm1* of the motor MG1 to the value of zero, and sets the torque command Tm2* of the motor MG2 so that the input shaft target torque Tin* is output to the input shaft 61 of the transmission 60. Then, the torque commands Tm1* and Tm2* for the motors MG1 and MG2 are transmitted to the motor ECU 40. The drive and the control of the motors MG1 and MG2 executed by the motor ECU 40 has been described above.

The control of the transmission 60 is basically performed as follows. The HV ECU 70 first sets the output shaft target torque Tout* with the setting method described later. Subsequently, the HV ECU 70 sets a target gear position Gs* of the transmission 60 based on the output shaft target torque Tout* and the vehicle body speed V, and controls the transmission 60 so that the gear position Gs of the transmission 60 becomes the target gear position Gs*.

The control of the transfer 120 is basically performed as follows. The HV ECU 70 sets a target rear side distribution ratio Rr* based on the accelerator operation amount Acc, the vehicle body speed V, the steering angle θs, etc., and controls the transfer 120 so that the rear side distribution ratio Rr becomes the target rear side distribution ratio Rr*.

Figure 6:
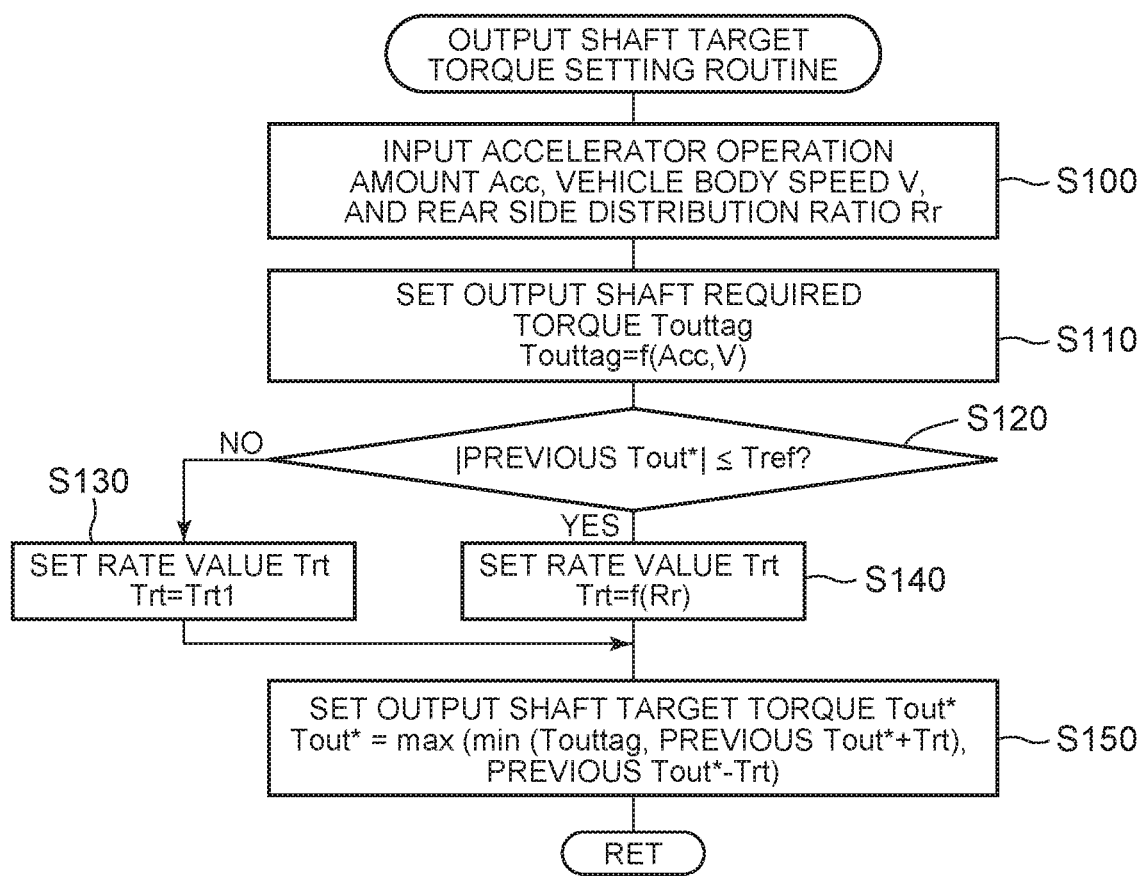
FIG. 6 is a flowchart showing an example of an output shaft target torque setting routine executed by an electronic control unit for hybrid vehicles (HV ECU) 70.

Next, the operation of the hybrid vehicle 20 according to the embodiment configured as described above will be described. In particular, the operation when setting the output shaft target torque Tout* to be output to the output shaft 62 of the transmission 60 will be described. FIG. 6 is a flowchart showing an example of an output shaft target torque setting routine executed by the HV ECU 70. This routine is executed repeatedly.

When the output shaft target torque setting routine is executed, the HV ECU 70 first inputs the accelerator operation amount Acc, the vehicle body speed V, and the rear side distribution ratio Rr (step S100). A value detected by the accelerator pedal position sensor 84 is input as the accelerator operation amount Acc. A value detected by the vehicle body speed sensor 88 is input as the vehicle body speed V. A value estimated by the HV ECU 70 based on the rotational position θmt of the rotor of the motor 141 of the transfer 120 is input as the rear side distribution ratio Rr.

With the data input in this manner, the HV ECU 70 sets an output shaft required torque Touttag required for the output shaft (drive shaft) 62 of the transmission 60 based on the accelerator operation amount Acc and the vehicle body speed V (step S110).

Subsequently, the HV ECU 70 compares an absolute value of the output shaft target torque (previous Tout*) that has been set when the routine was last executed with a threshold value Tref (step S120). Here, the previous output shaft target torque (previous Tout*) means the output shaft torque Tout that is output to the output shaft 62 of the transmission 60 (the torque input to the transfer 120). The threshold value Tref is a threshold value used for determining whether the output shaft torque Tout is close to the value of zero (whether the output shaft torque Tout is within a predetermined range including the value of zero), and is determined through experiment or analysis. The absolute value of the previous output shaft target torque (previous Tout*) is equal to or less than the threshold value Tref, for example, when the output shaft torque Tout crosses the value of zero.

In step S120, when the absolute value of the previous output shaft target torque (previous Tout*) is larger than the threshold value Tref, the HV ECU 70 determines that the output shaft torque Tout is not close to the value of zero, sets a relatively large predetermined value Trt1 as a rate value Trt (step S130), and sets the output shaft target torque Tout* upon executing a rate process on the output shaft required torque Touttag using the rate value Trt (step S150). This routine is thus ended. For example, the output shaft target torque Tout* is calculated by an equation (1) using the output shaft required torque Touttag, the previous output shaft target torque (previous Tout*), and the rate value Trt.

$$Tout^* = \max(\min(Touttag, \text{previous } Tout^* + Trt), \text{previous } Tout^* - Trt) \quad (1)$$

In step S120, when the absolute value of the previous output shaft target torque (previous Tout*) is equal to or smaller than the threshold value Tref, the HV ECU 70 determines that the output shaft torque Tout is close to the value of zero, sets the rate value Trt within a range smaller than the predetermined value Trt1 using the rear side distribution ratio Rr and the rate value setting map (step S140), and sets the output shaft target torque Tout* with the process of step S150. This routine is thus ended.

Figure 7:
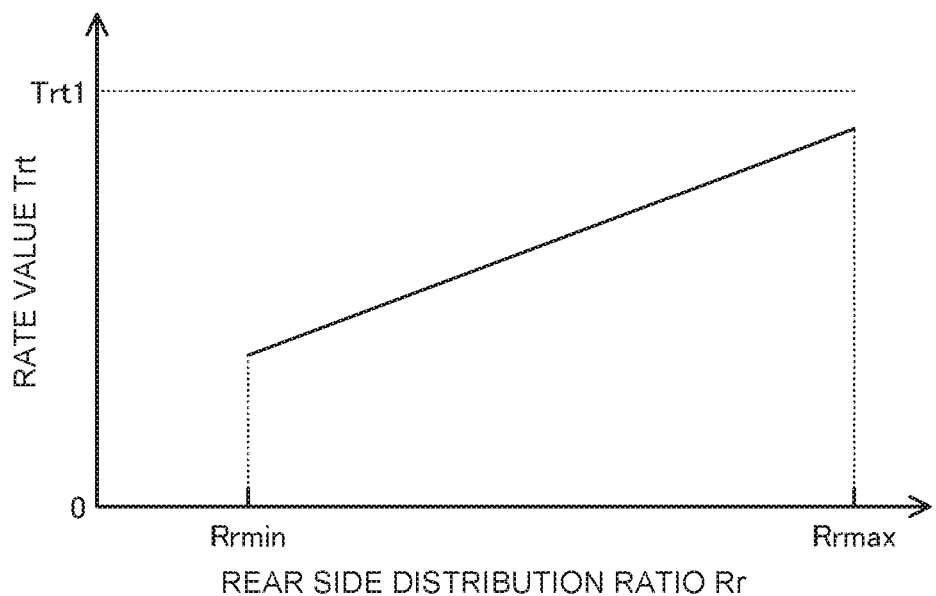
FIG. 7 is an explanatory graph showing an example of a rate value setting map.

The rate value setting map is defined as a relationship between the rear side distribution ratio Rr and the rate value Trt when the absolute value of the previous output shaft target torque (previous Tout*) is equal to or less than the threshold value Tref, and is stored in a ROM (not shown). FIG. 7 is an explanatory graph showing an example of the rate value setting map. As shown in FIG. 7, the rate value Trt is set to be linearly smaller as the rear side distribution ratio Rr is smaller (from the upper limit value Rrmax to the lower limit value Rrmin) within the range smaller than the predetermined value Trt1. The rate value Trt may be set to be non-linearly smaller or may set to be smaller in a stepwise manner as the rear side distribution ratio Rr is smaller. By setting the rate value Trt in this manner, when the output shaft torque Tout crosses the value of zero, a change in the output shaft target torque Tout* (output shaft torque Tout) with respect to a change in the output shaft required torque Touttag is more moderated as the rear side distribution ratio Rr is smaller.

When the rear side distribution ratio Rr is small, as compared with when the rear side distribution ratio Rr is large, the influence of a backlash in the transfer 120, the front differential gear 38f, and the rear differential gear 38r, etc. tends to be large when the output shaft torque Tout crosses the value of zero. Thus, when the rear side distribution ratio Rr is small, the rate value Trt is made smaller than when the rear side distribution ratio Rr is large, that is, the change in the output shaft target torque Tout* (output shaft torque Tout) with respect to the change in the output shaft required torque Touttag is moderated. This makes it possible to suppress a shock from occurring when the output shaft torque Tout crosses the value of zero. When the rear side distribution ratio Rr is large, the rate value Trt is made relatively large within the range smaller than the predetermined value Trt1. This makes it possible to quickly change to some extent the output shaft torque Tout, while suppressing a shock from occurring when the output shaft torque Tout crosses the value of zero.

In the hybrid vehicle 20 according to the embodiment described above, the output shaft target torque Tout* is set upon executing the rate process on the output shaft required torque Touttag using the rate value Trt, the input shaft target torque Tin* is set based on the set output shaft target torque Tout* and the gear ratio Gr of the transmission 60, and the engine 22 and the motors MG1 and MG2 are controlled so that the input shaft target torque Tin* is output to the input shaft 61 of the transmission 60. In this case, when the absolute value of the previous output shaft target torque (previous Tout*) is equal to or less than the threshold value Tref, the rate value Trt is set in a smaller range than when the absolute value of the previous output shaft target torque (previous Tout*) is larger than the threshold value Tref, and the rate value Trt set to be smaller as the rear side distribution ratio Rr is smaller. This makes it possible to suppress a shock from occurring when the output shaft torque Tout crosses the value of zero.

In the hybrid vehicle 20 according to the embodiment, the HV ECU 70 sets the output shaft target torque Tout* upon executing the rate process on the output shaft required torque Touttag using the rate value Trt. Alternatively, the HV ECU 70 may set the output shaft target torque Tout* by executing a smoothing process on the output shaft required torque Touttag using a time constant T. In this case, the output shaft target torque Tout* is calculated by an equation (2) using, for example, the output shaft required torque Touttag, the previous output shaft target torque (previous Tout*), and the time constant T. For example, the time constant T is set as follows. When the absolute value of the previous output shaft target torque (previous Tout*) is larger than the threshold value Tref, the time constant τ is set to a predetermined value τ1. When the absolute value of the previous output shaft target torque (previous Tout*) is equal to or less than the threshold value Tref, the time constant τ is set in a range larger than the predetermined value τ1 and smaller than the value of one, and is set to be larger as the rear side distribution ratio Rr is smaller. Thus, as in the embodiment, when the output shaft torque Tout crosses the value of zero, the change in the output shaft target torque Tout* (output shaft torque Tout) with respect to the change in the output shaft required torque Touttag is more moderated as the rear side distribution ratio Rr is smaller.

$$Tout^* = Touttag \cdot (1-\tau) + \text{previous } Tout^* \cdot \tau \quad (2)$$

In the hybrid vehicle 20 according to the embodiment, the HV ECU 70 estimates the rear side distribution ratio Rr based on the rotational position θmt of the rotor of the motor 141 of the transfer 120. Alternatively, the HV ECU 70 may use the target rear side distribution ratio Rr*, which has been set immediately before, as the rear side distribution ratio Rr in consideration of controlling the transfer 120 based on the target rear side distribution ratio Rr*.

In the hybrid vehicle 20 according to the embodiment, the motor MG2 is directly connected to the input shaft 61 of the transmission 60. Alternatively, the motor MG2 may be connected to the input shaft 61 of the transmission 60 via a speed reducer. Further, the motor MG2 may be directly connected to the output shaft 62 of the transmission 60. Further, the motor MG2 may be connected to the output shaft 62 of the transmission 60 via a speed reducer.

In the hybrid vehicle 20 according to the embodiment, the drive unit 140 of the transfer 120 includes the motor 141 and the screw mechanism 142 that converts the rotational movement of the motor 141 to the linear movement to drive the piston 134 of the clutch 130 (to move the piston 134 in the axial direction of the piston 134). Instead of the screw mechanism 142, the drive unit 140 may have a cam mechanism that converts the rotational movement of the motor 141 into the linear movement. Further, instead of the motor 141 and the screw mechanism 142, the drive unit 140 may have a hydraulic control device that drives the piston 134 by hydraulic pressure.

In the hybrid vehicle 20 according to the embodiment, the transfer 120 is configured such that the front-rear drive force distribution can be continuously changed in a range, for example, between 0:100 and 40:60 or between 0:100 and 50:50. However, the transfer 120 may be configured so that the front-rear drive force distribution can be switched, for example, between 0:100 and 40:60 or between 0:100 and 50:50.

In the hybrid vehicle 20 according to the embodiment, the four-speed transmission is used as the transmission 60. Alternatively, a three-speed transmission, a five-speed transmission, a six-speed transmission, or the like may be used as the transmission 60.

Figure 8:
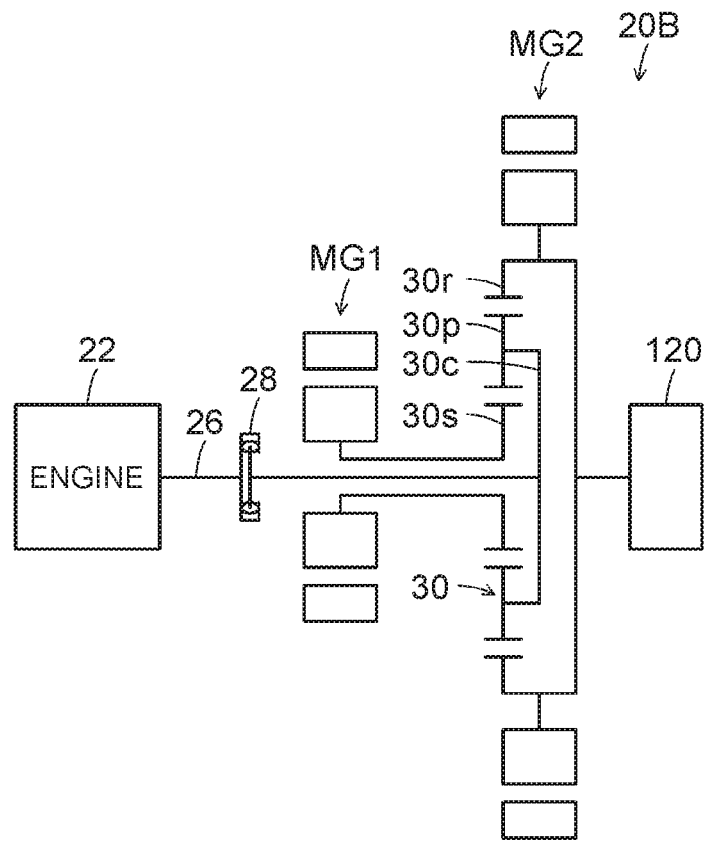
FIG. 8 is a configuration diagram showing an outline of a configuration of a hybrid vehicle 20B according to a modification.

In the hybrid vehicle 20 according to the embodiment, the transmission 60 is provided. That is, the ring gear 30r of the planetary gear 30, the motor MG2, and the rear wheel side transmission shaft 121 of the transfer 120 are connected via the transmission 60. Alternatively, as shown in the hybrid vehicle 20B according to a modification in FIG. 8, the transmission 60 need not be provided. In the hybrid vehicle 20B shown in FIG. 8, the planetary gear 30, the motor MG2, and the transfer 120 are directly connected to each other.

In the hybrid vehicle 20 according to the embodiment, the battery 50 is used as the power storage device. Alternatively, a capacitor may be used as the power storage device.

The hybrid vehicle 20 according to the embodiment includes the engine ECU 24, the motor ECU 40, the battery ECU 52, the brake ECU 96, and the HV ECU 70. Alternatively, at least two of the above ECUs may be configured as a single ECU.

Figure 9:
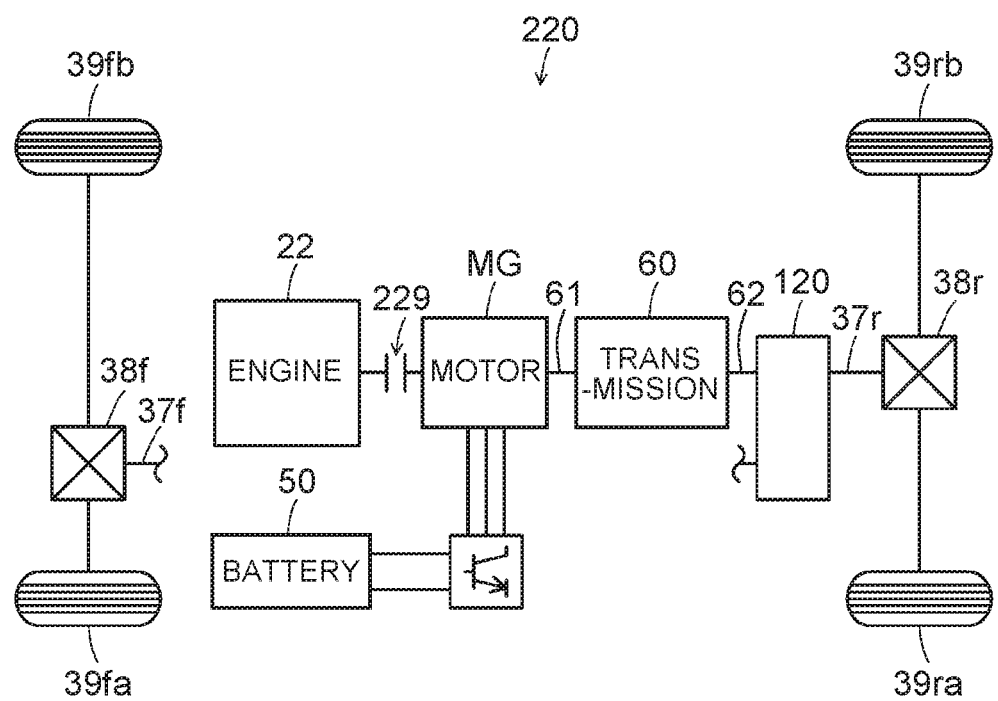
FIG. 9 is a configuration diagram showing an outline of a configuration of a hybrid vehicle 220 according to a modification.
Figure 10:
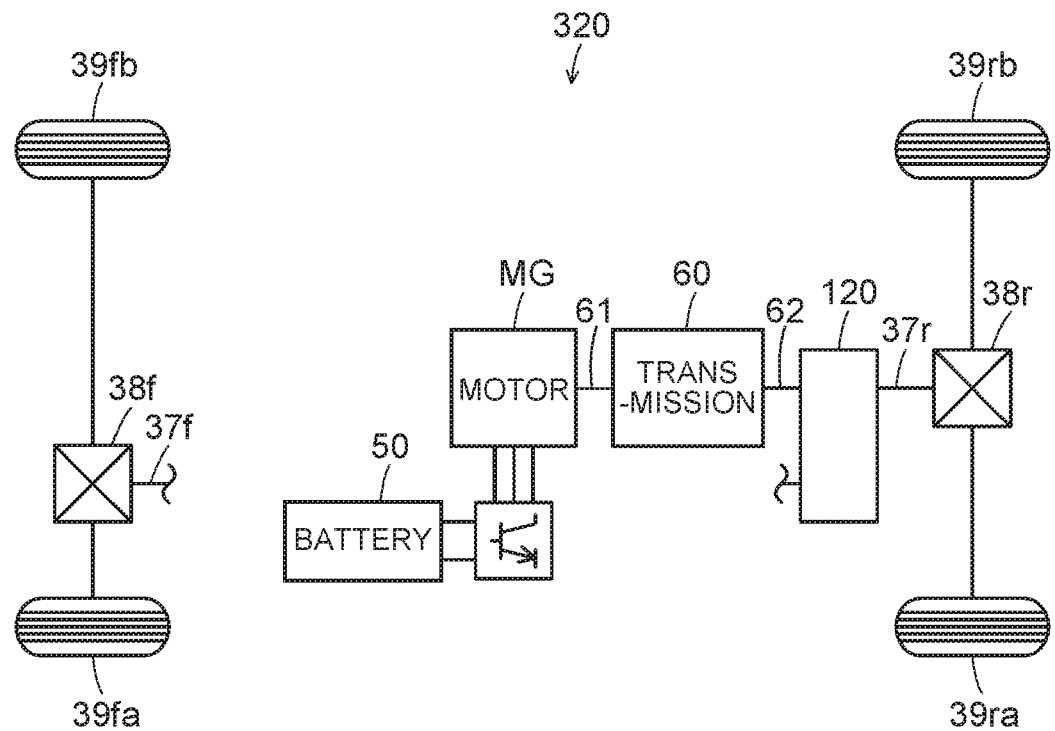
FIG. 10 is a configuration diagram showing an outline of a configuration of an electric vehicle 320 according to a modification.
Figure 11:
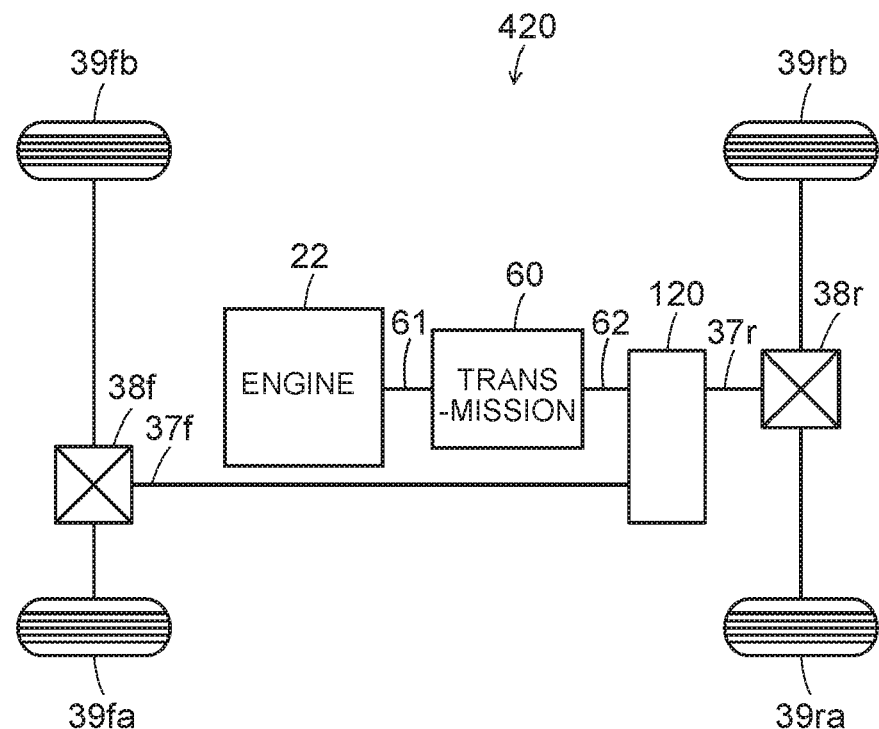
FIG. 11 is a configuration diagram showing an outline of a configuration of an automobile 420 according to a modification.

In the hybrid vehicle 20 according to the embodiment, the output shaft 62 of the transmission 60 is connected to the transfer 120, the ring gear 30r of the planetary gear 30 and the motor MG2 are connected to the input shaft 61 of the transmission 60, the sun gear 30s of the planetary gear 30 is connected to the motor MG1, and the carrier 30c of the planetary gear 30 is connected to the engine 22. Alternatively, as shown in a hybrid vehicle 220 according to a modification in FIG. 9, the output shaft 62 of the transmission 60 may be connected to the transfer 120, the motor MG may be connected to the input shaft 61 of the transmission 60, and the engine 22 may be connected to the motor MG via a clutch 229. Further, as shown in an electric vehicle 320 according to a modification in FIG. 10, the output shaft 62 of the transmission 60 may be connected to the transfer 120 and the motor MG may be connected to the input shaft 61 of the transmission 60 with no engine provided. Alternatively, in the electric vehicle 320, the motor MG may be directly connected to the transfer 120 with no transmission 60 provided. Further, as shown in a vehicle 420 in FIG. 11, the output shaft 62 of the transmission 60 may be connected to the transfer 120 and the engine 22 may be connected to the input shaft 61 of the transmission 60 with no motor provided.

The hybrid vehicles 20, 220, the electric vehicle 320, and the vehicle 420 according to the embodiment and the modifications are configured as part-time four-wheel drive (4WD) vehicles. Alternatively, the hybrid vehicles 20, 220, the electric vehicle 320, and the vehicle 420 according to the embodiment and the modifications may be configured as full-time 4WD vehicles.

The hybrid vehicles 20, 220 and the electric vehicle 320 according to the embodiment and the modifications are configured as rear wheel drive-based 4WD vehicles in which the rear wheels 39ra and 39rb serve as the driving wheels and the front wheels 39fa and 39fb serve as the driven wheels. Alternatively, the hybrid vehicle 20 may be configured as a front wheel drive-based 4WD vehicle in which the front wheels 39fa and 39fb serve as the driving wheels and the rear wheels 39ra and 39rb serve as the driven wheels.

The correspondence between the main elements of the embodiment and the main elements of the disclosure described in the summary of the disclosure will be described. The engine 22, the planetary gear 30, the motors MG1 and MG2, and the transmission 60 according to the embodiment can be regarded as a "drive device" in the disclosure, the transfer 120 according to the embodiment can be regarded as a "drive force distribution device" in the disclosure, and the HV ECU 70, the engine ECU 24, and the motor ECU 40 according to the embodiment can be regarded as a "control device" in the disclosure.

The correspondence between the main elements of the embodiment and the main elements of the disclosure described in the summary of the disclosure does not limit the elements of the disclosure in the summary of the disclosure, because the embodiment is merely an example for specifically describing the mode for carrying out the disclosure described in the summary of the disclosure. That is, the interpretation of the disclosure described in the summary of the disclosure should be made based on the description therein, and the embodiment is merely a working example of the disclosure described in the summary of the disclosure.

Although the mode for carrying out the disclosure has been described using the embodiment, the disclosure is not limited to the embodiment, and may be carried out in various modes without departing from the scope of the disclosure.

The disclosure can be used in the vehicle manufacturing industry and the like.

What is claimed is:

1. A vehicle comprising:
    driving wheels;
    driven wheels;
    a drive device connected to a drive shaft;
    a drive force distribution device configured to transmit a drive force from the drive shaft to the driving wheels and the driven wheels and adjust a driving side distribution ratio, the driving side distribution ratio being a ratio of the drive force that is transmitted from the drive shaft to the driving wheels with respect to a total drive force that is transmitted from the drive shaft to the driving wheels and the driven wheels; and
    an electronic control unit configured to execute a change process on a required torque required for the drive shaft to set a target torque to be output to the drive shaft when the torque output to the drive shaft changes and crosses a value of zero,
    the electronic control unit being configured to control the drive device such that the target torque is output to the drive shaft, and
    the electronic control unit being configured to set the target torque such that a change in the target torque with respect to a change in the required torque is smaller when the driving side distribution ratio is set to a first value than the change in the target torque with respect to the change in the required torque when the driving side distribution ratio is set to be a second value which is larger than the first value.

2. The vehicle according to claim 1, wherein the electronic control unit is configured to set the target torque such that the change in the target torque with respect to the change in the required torque decreases as the driving side distribution ratio decreases.

3. A control method of a vehicle, the vehicle including driving wheels, driven wheels, a drive device connected to a drive shaft, a drive force distribution device, and an electronic control unit,
    the drive force distribution device being configured to transmit a drive force from the drive shaft to the driving wheels and the driven wheels and adjust a driving side distribution ratio, and
    the driving side distribution ratio being a ratio of the drive force transmitted from the drive shaft to the driving wheels with respect to a total drive force transmitted from the drive shaft to the driving wheels and the driven wheels,
    the control method comprising:
    executing, by an electronic control unit, a change process on a required torque required for the drive shaft to set a target torque to be output to the drive shaft when the torque output to the drive shaft changes and crosses a value of zero;
    controlling, by the electronic control unit, the drive device such that the target torque is output to the drive shaft; and
    setting, by the electronic control unit, the target torque such that a change in the target torque with respect to a change in the required torque is smaller when the driving side distribution ratio is set to a first value than the change in the target torque with respect to the change in the required torque when the driving side distribution ratio is set to be a second value which is larger than the first value.

4. The control method according to claim 3, further comprising setting, by the electronic control unit, the target torque such that the change in the target torque with respect to the change in the required torque decreases as the driving side distribution ratio decreases.

* * * * *